United States Patent [19]
Chan

[11] Patent Number: 4,731,021
[45] Date of Patent: Mar. 15, 1988

[54] CLASSIFICATION LANGUAGE AND METHOD

[76] Inventor: See F. Chan, 4709 Newtown Rd., Astoria, N.Y. 11103

[21] Appl. No.: 883,348

[22] Filed: Jul. 8, 1986

Related U.S. Application Data

[63] Continuation-in-part of Ser. No. 650,520, Sep. 14, 1984, abandoned.

[51] Int. Cl.$^4$ .............................................. G09B 1/00
[52] U.S. Cl. .................................................. 434/156
[58] Field of Search ........................ 434/156, 172, 170

[56] References Cited

U.S. PATENT DOCUMENTS 466,296 12/1891 Clark .................................... 434/172
4,478,582 10/1984 Tucker ............................ 434/172 X

*Primary Examiner*—William H. Grieb
*Attorney, Agent, or Firm*—Handal & Morofsky

[57] ABSTRACT

Each word, of the words of a selected language such as english, is fully defined by a number of distinguishing characteristics of definition. Words having one or more identical distinguishing characteristics of definition are arranged into classification groups and the distinguishing characteristics of definition within each such classification group are arranged in a predetermined classification order. The classification order is such that identical distinguishing characteristics of definition for different words in the order are first arranged in corresponding positions for each such word in the classification order. Thereafter, the distinguishing characteristics of definition are arranged in corresponding positions for different words as the number of identical distinguishing characteristics of definition diminish until last to be arranged are different distinguishing characteristics of definition for each word.

A different symbol, consisting of one or more english language letters, is then assigned to each different distinguishing characteristic of definition; the symbols being arranged in the predetermined classification order. When so arranged the symbols spell out a classification word corresponding to the word of the original language but one from which the full definition of the word can easily be derived.

20 Claims, 19 Drawing Figures

| ENGLISH LANGUAGE WORD | DISTINGUISHING CHARACTERISTICS OF DEFINITION AND SELECTED SYMBOLS | | | | | |
|---|---|---|---|---|---|---|
| | a | b | c | d | e | f |
| GRASS 14 | MATTER 16a 30 [MO] | ORGANIC 16b 20a | VITALITY 16c | VEGETABILITY (PLANTAE) 16d [P]-20b | | HAVE SOFT AND JOINTED STEMS AND LONG NARROW LEAVES. (G)[RASS] 20d |
| TREE 10 | MATTER 32 [MO] | ORGANIC MATTER | VITALITY | VEGETABILITY (PLANTAE) [P] | | A LARGE PERENNIAL PLANT WITH A WOODY TRUNK. (T)[REE] |
| SHRUB 19 | MATTER 34 [MO] | ORGANIC MATTER | VITALITY | VEGETABILITY (PLANTAE) [P] | | A PERENNIAL WOODY PLANT WITH MANY SEPARATE STEMS STARTING IT FROM THE GROUND. (SH)[RUB] |
| FLOWER 14 | MATTER 36 [MO] | ORGANIC MATTER | VITALITY | VEGETABILITY (PLANTAE) [P] | PART OF PLANT [P] 20c | SEED BEARING PLANTS REPRODUCTIVE ORGANS. [FLO] |
| FRUIT 12 | MATTER 38 [MO] | ORGANIC MATTER | VITALITY | VEGETABILITY (PLANTAE) [P] | PART OF PLANT [P] | THE RIPENED OVARY OF A FLOWER. [FRU] |
| SEEDS 14 | MATTER 40 [MO] | ORGANIC MATTER | VITALITY | VEGETABILITY (PLANTAE) [P] | PART OF PLANT [P] | THE FERTILIZED AND MATURE OVULE. [SED] |

DISTINGUISHING CHARACTERISTICS OF DEFINITION AND SELECTED SYMBOLS

| ENGLISH LANGUAGE WORD | a | b | c | d | e | f |
|---|---|---|---|---|---|---|
| GRASS 14 | MATTER 16a 30 [MO] | ORGANIC 16b 20a | VITALITY 16c | VEGETABILITY (PLANTAE) 16d [P]~20b | | HAVE SOFT AND JOINTED STEMS AND LONG NARROW LEAVES. (G)[RASS] 20d |
| TREE 10 | MATTER 32 [MO] | ORGANIC MATTER | VITALITY | VEGETABILITY (PLANTAE) [P] | | A LARGE PERENNIAL PLANT WITH A WOODY TRUNK. (T)[REE] |
| SHRUB 19 | MATTER 34 [MO] | ORGANIC MATTER | VITALITY | VEGETABILITY (PLANTAE) [P] | | A PERENNIAL WOODY PLANT WITH MANY SEPARATE STEMS STARTING IT FROM THE GROUND. (SH)[RUB] |
| FLOWER 14 | MATTER 36 [MO] | ORGANIC MATTER | VITALITY | VEGETABILITY (PLANTAE) [P] | PART OF PLANT [P] 20c | SEED BEARING PLANTS REPRODUCTIVE ORGANS. [FLO] |
| FRUIT 12 | MATTER 38 [MO] | ORGANIC MATTER | VITALITY | VEGETABILITY (PLANTAE) [P] | PART OF PLANT [P] | THE RIPENED OVARY OF A FLOWER. [FRU] |
| SEEDS 14 | MATTER 40 [MO] | ORGANIC MATTER | VITALITY | VEGETABILITY (PLANTAE) [P] | PART OF PLANT [P] | THE FERTILIZED AND MATURE OVULE. [SED] |

FIG. 1

| ENGLISH LANGUAGE WORD | 70 | DISTINGUISHING CHARACTERISTICS OF DEFINITION AND SELECTED SYMBOLS | | | |
|---|---|---|---|---|---|
| | a | b | c | d | e |
| SUBSTANTIALITY 60 | ABSTRACT RELATION | EXISTENCE | CONCRETE | | SOLIDITY 70(d) |
| UNSUBSTANTIALITY 50 | ABSTRACT RELATION | EXISTENCE | CONCRETE | | UNSOLIDITY |
| IDENTITY 60 | ABSTRACT RELATION | RELATION | ABSOLUTE 70(e) | | AN EXACT SAMENESS |
| MATERIALS 60 | MATTER 70(a) | MATTER IN GENERAL | | | TO A LACK OF SAMENESS |
| PLASTIC 60 52 | MATTER | MATTER IN GENERAL | MATERIALS | ARTIFICIAL | ANYTHING SERVING AS CRUDE OR RAW MATTER FOR WORKING UPON OR DEVELOPING. |
| PAPER 60 | MATTER | MATTER IN GENERAL | MATERIALS | ARTIFICIAL | AN ARTICLE FABRICATED BY CHEMICAL SYNTHESIS: OFTEN MOLDED EASILY BY HEAT AND PRESSURE OR MADE INFUSIBLE AND INSOLUBLE BY CHEMICAL ACTION. 70(c) |
| WOOD 60 | MATTER | MATTER IN GENERAL | MATERIALS | NATURAL | TREES CUT INTO BOARD, PLANKS, ETC. |
| CLAY | MATTER | MATTER IN GENERAL | MATERIALS | NATURAL | A STIFF, STICKY KIND OF EARTH THAT CAN BE EASILY SHAPED WHEN WET AND HARDENS AFTER DRYING OR BAKING. |

FIG. 2

| ENGLISH LANGUAGE WORD | DISTINGUISHING CHARACTERISTICS OF DEFINITION AND SELECTED SYMBOLS 70 | | | |
|---|---|---|---|---|
| | a | b | c | d | e |
| IMPULSE | SPACE | MOTION | CONJOINED WITH FORCE | | THE EFFECT OF SUDDEN DRIVING OR INFLUENCE. |
| RECOIL 60 | SPACE | MOTION | CONJOINED WITH FORCE | | TO DRAW BACK. |
| DIRECTION | SPACE | MOTION | WITH REF. TO DIRECTION | | THE COURSE TAKEN BY MOVING BODY. |
| EAST 60 | SPACE | MOTION | WITH REF. TO DIRECTION | DIRECTION | WHERE THE SUN RISES. |
| WEST 54 60 | SPACE | MOTION | WITH REF. TO DIRECTION | DIRECTION | WHERE THE SUN SETS. |
| SOUTH 60 | SPACE | MOTION | WITH REF. TO DIRECTION | DIRECTION | WHEN YOU FACE THE RISING SUN IN THE EAST, SOUTH IS ON YOUR RIGHT. |
| NORTH | SPACE | MOTION | WITH REF. TO DIRECTION | DIRECTION | WHEN YOU FACE THE RISING SUN IN THE EAST, NORTH IS ON YOUR RIGHT. |

FIG. 3

Information Input

Figure 4(a)  [MO] [P] [REE]   has   [MO] [P] [P] [FRU]
             (tree)                      (fruit)

Question

Figure 4(b)  Possible   [EAT]      [MO] [P] [P] [FRU]   [?]
                                       (fruit)

Stored Experience

Figure 4(c)  [MO] [P] [P] [FRU]   must be   [REDI]
                 (fruit)                    (ripe)

Response

Figure 4(c)  Is   [MO] [P] [P] [FRU]      [REDI]   [?]
                      (fruit)             (ripe)

Further Information

Figure 4(e)  Yes

Conclusion

Figure 4(f)  Fruit can be eaten.

|  | Information Input |
|---|---|
| Figure 5(a) | [MO] [P] [REE]　　has　　[MO] [P] [P] [LUMB]<br>　　(tree)　　　　　　　　　　(lumber) |

|  | Question |
|---|---|
| Figure 5(b) | Possible to　[EAT]　[MO]　[P] [P] [LUMB]　[?] |

|  | Stored Experience |
|---|---|
| Figure 5(c) | [MO] [P] [P] [FRU]　　must be　[REDI]<br>　　(fruit)　　　　　　　　　　(ripe) |

|  | Response |
|---|---|
| Figure 5(d) | Is [MO] [P] [P] [LUMB]　　　[REDI]　[?]<br>　　　(lumber)　　　　　(hardened) |

|  | Further Information |
|---|---|
| Figure 5(e) | Yes |

|  | Conclusion |
|---|---|
| Figure 5(f) | Lumber can be used |

[MO] [P] [P] [LUMB]　　Figure 6(a)

[MO] [P] [P] [FRU]　　Figure 6(b)

[MO] [P] [REE]　　Figure 7

CLASSIFICATION LANGUAGE AND METHOD

CROSS REFERENCE TO RELATED APPLICATION

This application is a continuation-in-part of U.S. patent application Ser. No. 650,520 filed Sept. 14, 1984, now abandoned the disclosure of which is incorporated herein by reference.

FIELD OF THE INVENTION

This invention relates to language; and more particularly to the method of language formation and the language resulting therefrom.

BACKGROUND OF THE INVENTION

Language is, and has always been, an essential tool of man. It's uses are many and varied. It serves as a means of communication; as a means for making a record of historical, scientific and other happenings; as an essential part of instruction; as an entertainer, as a thought challenger, and in a host of other ways.

Cavemen used pictures to record their ideas. These pictographs or ideograms roughly drawn upon the walls of caves, attempted to show, through the mental and physical means then available, important events, happenings and the like.

Wedge shaped cuneiform characters, inscribed upon clay tablets was the form of the written language used by people in ancient Babylonia, Assyria, Persia and the surrounding area. While the Egyptians developed a language in the form of a system of symbols called hieroglyphics. However, only the very learned were able to write and decipher such languages. They were not for the masses; and so followed the development of language created from systems of symbols or alphabets representing sounds.

The Chinese language, for example, utilizes characters described as pictographic; but they only represented materiality. Something was needed to represent abstract relations, space, intellect, volition or affections. To accomplish this, Chinese language requires complex methods such as ideographic, suggestive, ideographic-phonetic, phonetic loan, derivative, and the like to construct the letters (symbols). The Chinese classification writing words, however, included many errors and things were improperly classified because of mistaken concepts or understandings.

The early scholars created a classification system for animals and plants. Latin and Greek words were combined in what is referred to as a binomial system of nomenclature; and each plant and animal was defined by two names. However, this is inadequate, from a classification point of view, since the names so applied to a particular plant or animal only defined part of its distinguishing characteristics. For example, animals in the dog family such as the fox and the wolf are named thusly:

Dog—*Canis familiaris*
Fox—*Canis vulgaris*
Wolf—*Canis lupus* while those in the cat family are names as follows:

Cat—*Felis domestica*
Lion—*Felis leo*
Tiger—*Felis tigoris*
Leopard—*Felis leopardus*

But the dog and cat family are defined by distinguishing characteristics such as: animal, vertebrata, mammalia, placentalis, canivora, fissipedia, and such is not indicated by the classification type binomial system of language.

Language has been developed to facilitate reading and writing. The symbols (alphabets) utilized facilitate pronouncing the symbols and the words created by combining the symbols. But most languages utilized today do not, in and of themselves, facilitate understanding the full meaning or definition of the word from a recognition of the symbols selected to create or make up the word.

SUMMARY OF THE INVENTION

It is therefore an object of this invention to provide a new and improved classification language.

It is another object of this invention to provide a new and improved classification language.

It is yet another object of this invention to provide a new and improved method of formulating a language.

It is still another object of this invention to provide a new and improved method of formulating a classification language.

It is yet still another object of this invention to provide a new and improved classification language wherein selected symbols are utilized to create words; each selected symbol facilitating defining the meaning of the word.

It is yet still a further object of this invention to provide a new and improved method of formulating a classification language wherein words are created from symbols selected to define the meaning of the word.

It is still a further object of this invention to provide a classification language which is easier to learn, from which the pronunciation of the sound of the word is known from its spelling and, due to its classification some meaning of the letter which it represents can be understood.

This invention involves a method of formation, communication and processing of a classification language and the language formed thereby; and contemplates: defining the meaning of the words by one or more distinguishing characteristics of definition; arranging words with one or more identical distinguishing characteristics of definition into a selected classification group; selecting a symbol, from a plurality of available symbols, for each such distinguishing characteristics of definition, and assigning to each such selected symbol the representation of its respective distinguishing characteristic of definition; arranging the symbols for each word in a predetermined order so that symbols representing identical distinguishing characteristics of definition for different words, in a selected classification group, appear in the same order and so as to be followed by those symbols representing different distinguishing characteristics of definition between the different words in a selected classification group.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWINGS

In the drawing:

FIG. 1 is a table illustrating by way of example, how the method of forming a classification language, according to the instant invention, would be applied to the definitions of a selected group of English language words; and shows the respective classification language words therefore according to the instant invention; and FIGS. 2 and 3 each show a table illustrating, by way of example, the arrangement of some additional groups of English language words and how their respective distinguishing characteristics of meaning would be arranged to facilitate applying thereto the method of classification language formation of FIG. 1 to obtain a classification language word therefor. FIGS. 4(a)-(f) show manipulation of information in the event of use of a known word;

FIGS. 5(a)-(f) show a similar manipulation of information in which the meaning of all words is not precisely known; and FIGS. 6-7 illustrate signature useful for indicating the completeness of classification words.

DESCRIPTION OF THE PREFERRED EMBODIMENT

For convenience, the invention will be described with respect to selected examples of English language words and respective distinguishing characteristics of definition therefor, also expressed in English, and by the formation of classification language words, for each such English language word, by utilizing a selected number of symbols, each representing one of said distinguishing characteristics of definition, from letters of the English language alphabet. It should be understood, nevertheless, that without departing from the scope of this invention that the English language words selected are merely a few of all the words in the English and other languages to which the instant invention can be applied. Furthermore, the specific distinguishing characteristics of definition are selected by way of example and more, less, or other similar characteristics may be utilized. The wording thereof may also be otherwise than as set forth. The particular symbols selected are also by way of example and other symbols or combinations of symbols may be utilized. The method and classification language of this invention is applicable to languages other than the English words and symbols illustrated herein.

With reference to FIG. 1, there is generally shown a classification group 10 of plants (grass, tree and shrub) and a classification group 12 of parts of plants (flower, fruit, and seeds). Each plant and plant part is referred to, for purposes of explaining the instant invention, by a common English language word 14. The meaning of each plant and plant part is defined by a number of distinguishing characteristics of definition 16 a-f. Classification group 12 may be regarded as a sub-group of classification group 10 because a number (a-d) of the distinguishing characteristics of meaning or definition 16 are identical for both groups.

The distinguishing characteristics of definition 16 are pertinent but their expression is merely exemplary since other words and arrangements of words may be used. Distinguishing characteristics of definition 16 is also an arbitrary title intended to include for the definition of each word the distinguishing characteristics, function, individuality, purpose, distinctiveness, special nature, property, essence, peculiarity, etc., thereof.

Each of the distinguishing characteristics of definition 16 a-f, or a number of such, is assigned a symbol 20. This symbol represents the selected distinguishing characteristic(s) of meaning in the context of the classification group 10, 12. Blocks bearing symbols 20 selected from letters of the English language can include: one such letter, as for symbol 20b; two such letter, as for symbol 20a; or more than two such letters, as for symbols 20c and 20d. If desired, other symbols (+,—, &, etc.) may be used; or symbols may be selected from other alphabets (such as Greek, German, Russian, Arabic, Gaelic, or Latin).

While the blocks may be blocks of wood as illustrated in FIG. 1, the blocks may be replaced by any physical medium such as computer random access memory or the like. When grouped together, and in a predetermined order, symbols 20, for all the distinguishing characteristics of definition 16 that define a particular English language word 14, themselves define a classification word 30-40. In the illustrated example the classification words [MO,P,RASS], [MO,P,REE] and [MO,P,RUB] would mean grass, tree and shrub, respectively.

The distinguishing characteristics of definition 16 for all words in each classification group 10, 12 that are identical (16a, 16b, 16c, and 16d) for all such words 14 appear first in the prescribed predetermined order of the classification groups MO,P and MO,P,P. Those distinguishing characteristics of definition 16e that are identical for only some, but not all, of the words 14 within the classification groups 10, 12 appear next in said predetermined order. Thereafter the distinguishing characteristics of definition 16f that are peculiar to each word 14 of the classification group 10, 12 appear.

Symbols 20 are similarly arranged in a predetermined order so as to correspond to their respective distinguishing characteristics of definition. Thus, for classification group 10 symbol 20a "MO" representing characteristics of definition 16a and 16b "matter" and "organic matter" together appears first for all words 14 in the classification group 10. The symbol 20a "MO" also appears first for all words 14 in groups 10 and 12. Symbol 20b "P" is utilized next to represent "vitality" 16c and "vegetability (plantae)" 16d for all words 14 in groups 10 and 12. For group 12, however, an additional symbol 20c "P" is utilized to represent 16e "part of plant" for all words 14 in group 12. Thereafter, each classification word 30-40 is completed with a symbol 20d indicative of its own peculiar distinguishing characteristic of definition 16f. Either the first letter of the respective English language word 14 may be utilized as this symbol; or if preferred a number of such letters (such as the first or last syllable) may be so utilized or the entire English language word used. This will facilitate transition from the English language to the classification language of this invention.

The resulting classification words 30, 32, 34, 36, 38, 40 etc., will thus readily include, through its symbols, its own easily recognizable definition.

In FIG. 2 there is shown two further classification groups 50, 52 while in FIG. 3 a third classification group 54 is shown. Each classification group 50, 52, 54 includes a number of English language words 60; and for each word 60 there is listed a group of distinguishing characteristics of definition 70a-70e. Symbols, representing the respective distinguishing characteristics of definition 70, have not been shown for these examples. It is not the particular symbols, in and of themselves, that form this invention, or the specific classification words spelled out by such symbols, but the manner in which such symbols are selected and arranged that constitutes this invention.

For all groups 50, 52, 54 the distinguishing characteristics of definition that are identical for all words 60 in the group are listed first, just as for the example of FIG.

1. Thus, for group 50 only 70a contains an identical distinguishing characteristic of definition for all words 60 and would accordingly have an identical symbol assigned thereto. For group 50, 70b a first symbol would be assigned to the first two words 60, and another for the next two words 60. Still other symbols would be used for 70c the first two words 60 and another symbol for the next two words 60 in 70c. For 70e a different symbol would be utilized for each word. Once all symbols have been so assigned the symbols for each word taken together would spell out a corresponding classification word.

For group 52 the identical symbol would be assigned for all words 60 for distinguishing characteristics of definition 70a; and identical symbols assigned for 70b and 70c, except that no 70c symbol (and no 70d symbol) would be assigned for the first word since no distinguishing characteristics of definition appear with respect thereto. The symbols assigned for 70d would be identical for the second and third words 60 in group 52 and identical for the fourth and fifth words 60 in group 52 but differ from the 70d symbols utilized for the second and third words. A different symbol would be used for 70e for all words 60 in group 52.

In similar manner symbols would be selected and assigned for each word 60 and each different distinguishing characteristics of definition 70a-70e of the FIG. 3 example.

It will thus be seen that it is important to first determine or derive a classification system for the words of the language. The classification system should arrange words of the base language to be classified into groups of words having one or more similar distinguishing characteristics of meaning. In the examples of this invention the base language is English. A classification system that can be used, and is in fact applied to the instant invention, is one derived from Roget's Thesaurus. In the classification language to form and classify based on the Roget's Thesaurus plan of classification one could have the animal kingdom based on zoology and the plant kingdom based on botany (systems of scientific classification). Minerals or rocks may be used on mineraology classification, chemicals based on chemical classification and electricity, electronics, heat, light, magnetism, mechanics, sound and other related concepts based on physics.

The Roget's Thesaurus plan of classification and a system of scientific classification is set out in detail in the following pages for the purpose of better and more fully understanding how to set up and formulate the instant classification language. Following that plan of classification is a more detailed listing of how certain groups of English language words, similar to groups 50, 52, and 54 (of FIGS. 2 and 3), would be arranged according to such a plan of classification. Thereafter, one need only assign symbols to the listed distinguishing characteristics of definition as was done for the examples in FIG. 1, in order to formulate the classification language of the instant invention.

As discussed above, it is contemplated that in accordance with the present invention, it would be possible to manipulate and deal with information even when the particular exact meaning of a given word is not known, provided that the language of information manipulation is the classification language of the present invention. While this may be of definite value in the case of inter-human communication, as between people having different native languages, and the like, it is contemplated that the language system of the present invention will be of particular usefulness in the case of computerized manipulation of information and, in particular, the area of artificial intelligence. In accordance with the language and the method of the present invention, it is possible to deal with information even where the precise meaning of the words is not known.

For example, as shown in FIG. 4, we might consider a situation where a certain amount of information is put into an information processing system. As shown in FIG. 4(a) the information takes the form of the phrase "tree has fruit". In accordance with the method of the present invention, tree is represented by blocks bearing symbols MO, P, and REE and fruit is represented by the blocked word [MO,P,P,FRU].

A question could then be put to the system seeking to know whether it is possible to eat the fruit. In particular the words "possible" and "eat" are used to ask a question together with the word as shown in FIG. 4(b). If we are dealing with an information processing system, a stored experience (FIG. 4(c)) would indicate that fruit must be ripe in order to be eaten. This, in turn, would provoke the response seeking further information "is fruit ripe?" which would take the form of a suitable classification word for "is" and the classification words [Mo, P, P, FRU] and [REDI] as shown in FIG. 4(d). In the event of a positive answer to the question, a conclusion (FIG. 4(f)) can be drawn that the fruit can be eaten.

Turning to FIG. 5 consider a situation in which all vocabulary is not necessarily known. Here, the phrase "tree has lumber" (FIG. 5(a)) appears with "lumber" represented by the classification word [MO, P, P, LUMB]. As shown in FIG. 5(b), the word [EAT] (meaning to consume) is used in asking the question whether the lumber is suitable for use. Not being familiar with the word [MO,P,P,LUMB] but knowing that it is a vegetable product in the same family as fruit the stored experience respecting fruit may be referred to FIG. 5(c), thus provoking the response (FIG. 4(d) seeking further information and asking if the wood is ready. While, in the case of lumber, wood must be hardened as opposed to ripened, the same classification word [REDI] may be used and understood. Thus upon receiving further information that the wood is hardened (FIG. 5(e)), the conclusion can be drawn that the wood can be used (FIG. 5(f)).

It is thus seen that using the method and classification language of the present invention, it is possible to intelligently deal with information, albeit that some of that information is new.

Furthermore, as noted above, while the invention has been described in connection with information in the form of a language being carried on three-dimensional blocks, the words of the classification language may be carried on any medium, such as, for example, computer memory. In the use of wooden blocks, however, it is contemplated that such wooden blocks can be used to teach the language to people and as an analysis aid to machine system designers.

In order to facilitate use of the classification language of the present invention, it is contemplated that the signature information would appear at the beginning and/or each block bearing a distinguishing characteristic of definition. Distinguishing characteristics of definition in the same family would carry identical signatures. Signatures can also be designed in order to dictate their position in a word. Thus, as shown in FIG. 6(a), the word for lumber [MO,P,P, LUMB] would have signatures in the form of mating black marks which are identical to the classification word for fruit [MO,P,P,FRU], thus indicating commonality. As shown in FIG. 6(c) the determinitive part of the classification, here distinguishing characteristic REE would have no signature at its end thus indicating that a classification word is complete. Likewise, the beginning distinguishing characteristic MO would have no beginning signature.

Finally, as shown in FIG. 7, words unrelated to materiality would have completely different signatures such as the double bar signature combined with the circle single bar signature.

ROGET'S THESAURUS
AND OTHERS PLAN OF CLASSIFICATION

I   Abstract Relation
II  Space
III Matter
IV  Intellect
V   Volition
VI  Affection I.  ABSTRACT RELATIONS
    A. Existence
       (Abstract, Concrete, Formal, Modal)
    B. Relation
       (Absolute, Continuous, Partial, General)
    C. Quantity
       (Simple, Comparative, Conjunctive, Concrete)
    D  Order
       (General, Consecutive, Collective, Distributive, Categorical)
    E. Number
       (Abstract, Determinate, Indeterminate)
    F. Time
       (Absolute, Relative, Recurrent)
    G. Change
       (Simple, Complex)
    H. Causation
       (Constancy of Sequence, Connection between Cause and Effect, Power in Operation, Indirect Power, Combination of Causes)
II. SPACE
    A. Space in General
       (Abstract Space, Relative Space, Existence in Space)
    B. Dimensions
       (General, Linear, Centric)
    C. Form
       (General, Special, Superficial)
    D. Motion
       (General, Degrees, of Motion, Conjoined with Force, With Reference to Direction)
III. MATTER
    A. Matter in General
       include:
       Materials (Natural, artifical)
       Minerals (Common mineral with metallic luster, common mineral with non-metallic luster)
       Rocks (Igneous, metamophic, sedimentary)
       Elements (Metals, non-metals)
    B. Inorganic Matter
       (Solids, Fluids, Imperfect Fluids)
    C. Organic Matter
       1. Vitality
          A classification of animal kingdom
          Subkingdom *protozoa* (one celled animals)
              *protozoa*
          Subkingdom *parazoa* (many celled animals without a true digestive cavity)
              *porifera* (sponges)
          Subkingdom *metazoa* (many celled animals with true digestive cavities
              *mesozoa*
              *coelenterate* (coelenterates)
              *ctenophora* (combjellies)
              *platyhelminthes* (flatworms)
              *nemertineaa* or *nemertea* (ribbon worms)
              *entoprocta*
              *ectoprocta* or *bryozoa* (mass animals)
              *aschelminethes*
              *acanthocephala* (spiny-headded worms)

ROGET'S THESAURUS
AND OTHERS PLAN OF CLASSIFICATION
— continued

*phoron* idea
              *pogonophora* (beard worms)
              *brachiopoda* (lamp shells)
              *echinodermata* (echinoderms)
              *chaetognatha* (arrow worms)
              *mollusca* (mollusks)
              *annelida* (segmented worms)
              *sipynculoidea* (peanut worms)
              *priapuloidea*
              *echiyroidea*
              *arthropoda* (arthropods or joint-footed animals)
              *chordata* (chordates)
                  *hemichordata* (tongue worms)
                  *cephalochordata* (lancelets)
                  *tunicata* (tunicates)
                  *vertebrata* (vertebrates)
                      *cyclostomata* (lampreys and hag fishes)
                      *chondrichthyes* (cartilaginous fishes)
                      *osteichthyes* (bony fishes)
                      *amphibia* (amphibians
                      *reptilia* (reptiles)
                      *aves* (birds)
                      *mammalia* (mammals)
          A classification of plant kingdom
          Subkingdom *thallophyta* (plant without true roots, stems and leaves)
          Algae
              phylum *euglenophyta*
              phylum *chrysophyta*
              phylum *pyrrophyta*
              phylum *chlorophyta*
              phylum *phaeophyta*
              phylum *phodophyta*
          Fungi
              phylum *schizophyta* (bacillaraceau, coccaceae, spirillaceae)
              phylum *myxomycophyta*
              phylum *eumycophyta*
          Subkingdom *embryophyta* (plants that grow from an embryo)
          Mosses and Liverworts
              phylum *bryophyta*
              class *hepaticae*
              class *muscia*
          Subkingdom *embryophyta* (plants that grow from an embryo)
          Vascular Plants
              phylum *tracheophyta*
              subphylum *psilopsida*
              subphylum *lycopsida*
              subphylum *sphenopsida*
              subphylum *pteropsida*
              class *fillcineae*
              cone-bearing plants
              class *gymnospermal*
              subclass *cycadophytae*
              subclass *conferophytai*
              flowering plants
              class *angiospermai*
              subclass *dicotyledonae*
              subclass *monocotyledonae*
       2. Sensation
          (general, special, sound in general, musical sounds, perception of sound, light in general, specific light, perception of light)
IV. INTELLECT
    (Format Of Ideas)
    A. Intellectual Operations in General
    B. Precursory Condition and Operations
    C. Materials for Reasoning
    D. Reasoning Processes
    E. Results of Reasoning
    F. Extension of Thought
    G. Creative Thought
    (Communication Of Ideas)
    A. Nature of Ideas Communicated
    B. Modes of Communication

ROGET'S THESAURUS AND OTHERS PLAN OF CLASSIFICATION -continued

C. Means of Communicating Ideas
(Natural, conventional, qualities of style, spoken language, written language)

V. VOLITION (Individual Volition)

A. Volition in General
(Acts, causes, objects)
B. Prospective Volition
(Conceptional, subservience to ends, precursory measures)
C. Voluntary Action
(Simple, complex)
D. Antagonism
(Conditional, active)
E. Results of Action (Intersocial Volition)

A. General
B. Special
C. Conditional
D. Possessive Relations
(Property in general, transfer of property, interchange of property, monetary relations)

VI. AFFECTION

A. Affection Generally
B. Personal
(Passive, discriminative, prospective, contemplative, extrinsic)
C. Sympathetic
(Social, diffusive, retrospective)
D. Moral
(Obligation, sentiments, condition, practice, institutions)
E. Religious
(Superhuman, doctrines, sentiments, acts, institutions)

In the following pages that first column of words are English language words to be classified in order to formulate their meaning for classification into the language of the instant invention. The columns that follow the first column set out the distinguishing characteristics of meaning utilized for the instant classification language. In this instance the distinguishing characteristics of mean utilized are patterned after or derived from the Roget's Thesaurus Plan of Classification and a system in scientific classify of inorganic matter or organic matter classification set out in the preceding pages.

The application of symbols, to the distinguishing characteristics of meaning for the English language words hereinafter listed, is thus an easy task in view of the description of how to do so set out for the English language words of the examples of FIG. 1; and in view of the English language words, and their distinguishing characteristics of definition hereinafter listed. To do so for all words of the English language, or for any other language, is now clear and easy from this description.

| | | | | | |
|---|---|---|---|---|---|
| SUBSTANTIALITY | ABSTRACT RELATION | EXISTENCE | CONCRETE | SOLIDITY | |
| IDENTITY | ABSTRACT RELATION | RELATION | ABSOLUTE | AN EXACT SAMENESS | |
| GREATNESS | ABSTRACT RELATION | QUANTITY | COMPARATIVE | MORE | |
| BEGINNING | ABSTRACT RELATION | ORDER | CONSECUTIVE | START | |
| BISECTION | ABSTRACT RELATION | NUMBER | DETERMINATE | ONE OF TWO EQUAL AMOUNTS | |
| NEWNESS | ABSTRACT RELATION | TIME | RELATIVE | NEVER HAVING EXISTED BEFORE | |
| SUBSTITUTION | ABSTRACT RELATION | CHANGE | SIMPLE CHANGE | THE USE OF ONE THING FOR ANOTHER | |
| CAUSE | ABSTRACT RELATION | CAUSATION | CONSTANCY OF SEQUENCE | WHATEVER PRODUCED AN EFFECT | |
| RECEPTACLE | SPACE | SPACE IN GENERAL | EXISTENCE IN SPACE | ANY CONTAINER OR PLACE USED TO PUT THINGS IN TO KEEP THEM CONVENIENTLY | |
| DISTANCE | SPACE | DIMENSIONS | GENERAL DIMENSIONS | SPACE IN BETWEEN | |
| LENGTH | SPACE | DIMENSIONS | LINEAR | A LONG STRETCH | |
| CHAIR | SPACE | DIMENSIONS | LINEAR | SUPPORT | A SEAT THAT HAS A BACK |
| SUIT | SPACE | DIMENSIONS | CENTRIC | CLOTHING | A SET OF CLOTHES ARMOR, VESTMENT, ETC. |
| AUTOMOBILE | SPACE | MOTION | GENERAL | VEHICLE | THAT CARRIES ITS OWN ENGINE AND IS USED ESPECIALLY ON STREETS AND ROADS |
| WALK | SPACE | MOTION | GENERAL MOTION | TO GO ON FOOT | |
| VELOCITY | SPACE | MOTION | DEGREES OF MOTION | A QUICKNESS OF MOTION | |
| ASCENT | SPACE | MOTION | WITH REF. TO DIRECTION | UPWARD MOVEMENT | |
| STRAIGHTNESS | SPACE | FORM | SPECIAL FORM | SHORTEST DISTANCE BETWEEN TWO POINTS | |
| CONVEXITY | SPACE | FORM | SUPERFICIAL | CONVEX SURFACE | |
| MOON | MATTER | MATTER IN GENERAL | UNIVERSE | SATELLITE | A HEAVENLY BODY THAT REVOLVES AROUND EARTH |
| SUN | MATTER | MATTER IN GENERAL | UNIVERSE | FIXED STAR | THE CENTRAL BODY OF THE SOLAR SYSTEM |
| EARTH | MATTER | MATTER IN GENERAL | UNIVERSE | PLANET | THE PLANET ON WHICH WE LIVE |
| GOLD (AU) | MATTER | MATTER IN GENERAL | CHEMICALS | ELEMENT METAL | A SHINY, BRIGHT-YELLOW OF GREAT MALLEABILITY AND DUCTILITY |
| OXYGEN (O) | MATTER | MATTER IN GENERAL | CHEMICALS | ELEMENT NON-METAL | COLORLESS, ODORLESS GAS ESSENTIAL TO ALL VEGETABLE AND ANIMAL LIFE |
| BENZE | MATTER | MATTER IN GENERAL | CHEMICALS | ORGANIC COMPOUNDS HYDROCARBONS | A COLORLESS LIQUID OBTAINED CHIEFLY FROM COAL TAR |
| SUGAR | MATTER | MATTER IN GENERAL | CHEMICALS | ORGANIC COMPOUNDS CARBOHYDRATES | A SWEET SUBSTANCE OBTAINED CHIEFLY FROM SUGAR CANE AND BEETS |

-continued

| | | | | |
|---|---|---|---|---|
| FATS | MATTER | MATTER IN GENERAL | CHEMICALS | ORGANIC COMPOUNDS | ORGANIC ACIDS | OILY SUBSTANCE FORMED IN THE BODIES OF ANIMALS, ALSO FOUND IN SOME SEEDS OF PLANTS |
| OXIDES | MATTER | MATTER IN GENERAL | CHEMICALS | INORGANIC COMPOUNDS | A COMPOUND OF OXYGEN WITH ANOTHER ELEMENT OR RADICAL |
| BASES | MATTER | MATTER IN GENERAL | CHEMICALS | INORGANIC COMPOUNDS | A CHEMICAL COMPOUND THAT REACTS WITH AN ACID TO FORM A SALT |
| GOLD | MATTER | MATTER IN GENERAL | MINERALS | INORGANIC MINERALS | WITH METALLIC LUSTER | A BRIGHT YELLOW, PRECIOUS METALLIC CHEMICAL ELEMENT OF GREAT MALLEABILITY AND DUCTILITY |
| CINNABAR | MATTER | MATTER IN GENERAL | MINERALS | INORGANIC MINERALS | WITH NON-METALLIC LUSTER | A REDDISH OR BROWNISH MINERAL THAT IS THE CHIEF SOURCE OF MERCURY, NATIVE MECURIC SULFIDE. |
| PUMICE | MATTER | MATTER IN GENERAL | ROCK | INGNEOUS | A LIGHT SPONGY STONE THROWN UP FROM VOLCANOS, USED IN CLEANING, SMOOTHING AND POLISHING |
| MARBLE | MATTER | MATTER IN GENERAL | ROCK | METAMOPHIC | A HARD, CRYSTALLINE LIMESTONE FOUND IN VARIOUS COLORS AND CAPABLE OF TAKING A FINE POLISH |
| SHALE | MATTER | MATTER IN GENERAL | ROCK | SEDIMENTARY | A FINE GRAINED ROCK FORMED FROM CLAY OR MUD THAT SPLITS EASILY INTO THIN LAYERS |
| DENSITY | MATTER | INORGANIC | SOLID | THE QUANTITY OF ANYTHING PER UNIT AREA |
| WATER | MATTER | INORGANIC | FLUIDS | THE LIQUID THAT CONSTITUTES RAIN |
| BUBBLE | MATTER | INORGANIC | IMPERFECT FLUIDS | A THIN FILM OF LIQUID ENCLOSING AIR OR GAS |

| THE NAME OF ANIMALS | KINGDOM | PHYLUM OR DIVISION | CLASS | ORDER | FAMILY | GENUS | SPECIES |
|---|---|---|---|---|---|---|---|
| JELLYFISH | ANIMALIA | COELENTERATA | HYDROMEDYSEA | SCYPHOMEDUSAE | DISCOMEDYSAE | CANOSTOMIAE | MEDUSA |
| SEA CUCUMBER | ANIMALIA | ECHINODERMATA | HOLOTHUROIDEA | PEDATA | ASPIDOCHIROTAE | STICHOPUS | S. JAPONICUS SELENKA |
| EARTH WORMS | ANIMALIA | VERMES | ANNELIDES | POLYCHAETA OLIGOCHAETA | LUMBRICIDAE | LYMBRICUS | LYMBRICUS TERRESTRIS |
| SNAIL | ANIMALIA | MOLLUSCA | GASTROPODA | PULMONATA | HELICIDAE | EUTOTA | E. CALLIZOMA MARITIMA |
| OCTOPUS | ANIMALIA | MOLLUSCA | CEPHALOPODA | DIBRANCHIA | OCTOPODIAE | OCTOPUS | P. OCTOPODIA |
| CRAB SPIDER | ANIMALIA | ARTHROPODA | ARACHNIDA | ARANEIDA | THOMISIDAE | MISUMENA | M. VATIA |
| SCORPION | ANIMALIA | ARTHROPODA | ARACHNIDA | ABTHROGASTCA | SCORPIONIDAE | BUTHUS | BUTHUS SP |
| DRAGONFLY | ANIMALIA | ARTHROPODA | INSECTA | NEUROPTERA ODONATA | AESCHNIDAE | ANAX | A. PARTHENOPE |
| MOSQUITOES | ANIMALIA | ARTHROPODA | INSECTA | DIPTERA NEMOCERA | CULICIDAE | CULEX | C. FUSCANUS |
| CICADAS | ANIMALIA | ARTHROPODA | INSECTA | RHYNCHOTA | CICADIDAE | PERIODICAL | P. CICADAS |
| GRASS HOPPERS | ANIMALIA | ARTHROPODA | INSECTA | ORTHOPTERA | ACRIDLIDAE | ACRIDIUM | A. SUCCINCTUM |
| FIREFLY | ANIMALIA | ARTHROPODA | INSECTA | COLEOPTERA | LAMPYRIDAE | LUCIDLA | L. VITTICOLIS |
| HONEY BEE | ANIMALIA | ARTHROPODA | INSECTA | HYMENOPTERA | APIDAE | APIS | A. MELLIFERA |
| BUTTERFLY | ANIMALIA | ARTHROPODA | ISNECTA | LEPIDOPTERA | NYMPHALIDAE | VANTHOMELAS | V. XANTHOMELAS |
| LAMPREY | ANIMALIA | CHORDATA VERTEBRATA | FISCHES (PISCUS) CYCLOSTOMATA | HYPEROARTIA | PETROMYZONTIDAE | PETROMYZON | P. MARINUS |
| BULL-HEAD SHARK | ANIMALIA | CHORDATA VERTEBRATA | FISCHES (PISCUS) SELACHII | PLACLOSTOM SQUALY | HETERODONTIDAE | HETERDONTUS | H. PHILIPPI |
| SKATES | ANIMALIA | CHORDATA VERTEBRATA | FISCHES (PISCUS) SELACHII | PLAGLOSTOM RAJI | RAJIDAE | RAJA | R. KENOJEI |
| AFRICAN LUNGFISH | ANIMALIA | CHORDATE VERTEBRATA | FISHES (PISCUS) OSTEICHTHYES | DIPNOI | LEPIDOSIRONIDAE | PROEPTERUS | P. ANNECTAUS |
| SUCKER | ANIMALIA | CHORDATE VERTEBRATA | FISCHES (PISCUS) OSTEICHTHYES | TELEOSTEI ACANTHOPTERY | CATOSTOMIDAE | CATOSTOMUS | C. COMMERSONII |
| FLOUNDERS | ANIMALIA | CHORDATE VERTEBRATA | FISCHES (PISCUS) OSTEICHTHYES | TELEOSTEI ANACANTHINII | PLEURONECTIDAE | PARLICHTHS | P. DENTATUS |
| CARD | ANIMALIA | CHORDATE VERTEBRATA | FISCHES (PISCUS) OSTEICHTHYES | TELEOSTEI PHYSOSTOMI | CYPRINIDAE | CYPRINUS | C. CARP |
| LEATHER FISH | ANIMALIA | CHORDATE VERTEBRATA | FISCHES (PISCUS) OSTEICHTHYES | TELEOSTEI PLECTOGNATHI | MONACANTHIDEA | MONACANTHUS | M. CIRRHIFER |
| SEAHORSE | ANIMALIA | CHORDATE VERTEBRATA | FISCHES (PISCUS) OSTEICHTHYES | TELEOSTEI LOPHOBRANCHI | SYNGNATHIDAE | HIPPOCAMPUS | H. HUDSONIUS |
| FROGE | ANIMALIA | CHORDATE VERTEBRATA | AMPHIBIA | ANDURA (SALIENTIA) | RANIDAE | RANA | R. ESCULENTA |
| CROCODILE | ANIMALIA | CHORDATE VERTEBRATA | REPTILIA | CROCODILIA | CROCODYLIDAE | CROCODYLUS | C. VULARISCUV |
| EAGLE | ANIMALIA | CHORDATA VETERBRATA | AVES | RAPTAROES | FALCONIDAE | ASTUR | A. PALUMBARIUS |
| WOODPECKER | ANIMALIA | CHORDATA VETERBRATA | AVES | SCANCORES | PICIDAE | PICUS | P. CANNUS |
| SWALLOW | ANIMALIA | CHORDATA VETERBRATA | AVES | PASSERIFORMES | HIRYNDINIDEA | HIRUNDO | H. ERYTHROGASTER |
| FOWL | ANIMALIA | CHORDATA VETERBRATA | AVES | GALLINACEI | PHASIANIDAE | GALLUS | G. DOMESTICUS |
| CRANE | ANIMALIA | CHORDATA VETERBRATA | AVES | GRALLAE | GRUIDAE | GRUS | G. AMERICANA |

-continued

| | KINGDOM | PHYLUM OR DIVISION | CLASS | ORDER | FAMILY | GENUS | SPECIES |
|---|---|---|---|---|---|---|---|
| GOOSE | ANIMALIA | CHORDATA VETERBATA | AVES | NATATORES (ANSERES) | ANATIDAE | ANSER | A. DOMESTCA |
| MAN | ANIMALIA | CHORDATA VETERBATA | MAMMALIA (PLACENTALIS) | PRIMATES BIMANA | HOMINIDAE | HOMO | H. SAPIENS |
| GORILLA | ANIMALIA | CHORDATA VETERBATA | MAMMALIA (PLACENTALIS) | PRIMATES ANTHROPOIDEA CATARRHINI | PONGIDAE | SIMIA | S. SATYRUS |
| BLACK RAT | ANIMALIA | CHORDATA VETERBATA | MAMMALIA (PLACENTALIS) | RODENTIA | MURIDAE | RATTUS | M. RATTUSL |
| DOLPHINS | ANIMALIA | CHORDATA VETERBATA | MAMMALIA (PLACENTALIS) | CETACEA ODONTOCET | DELPHINIDAE | DELPHINUS | D. DELPHIS |
| CAT | ANIMALIA | CHORDATA VETERBATA | MAMMALIA (PLACENTALIS) | CARNIVORA FISSIPEDIA | FELIDAE | FELIS | F. DOMESTICA BRISS |
| DOG | ANIMALIA | CHORDATA VETERBATA | MAMMALIA (PLACENTALIS) | CARNIVORA FISSIPEDIA | CANIDEA | CANIS | C. FAMILIARIS |
| POLAR BEAR | ANIMALIA | CHORDATA VETERBATA | MAMMALIA (PLACENTALIS) | CARNIVORA FISSIPEDIA | URSIDAE | URSUS | U. MARITIMUS |
| WEASEL | ANIMALIA | CHORDATA VETERBATA | MAMMALIA (PLACENTALIS) | CARNIVORA FISSIPEDIA | MUSTELIDAE | MUSTELA | M. FRENATE |
| CAMEL | ANIMALIA | CHORDATA VETERBATA | MAMMALIA (PLACENTALIS) | UNGULAT ARTIODACTYLA RUMINANTIA | CAMELIDAE | CAMILUS | C. DROMEDARIS |
| CATTLE | ANIMALIA | CHORDATA VETERBATA | MAMMALIA (PLACENTALIS) | UNGULAT ARTIODACTYLA RUMINANTIA | BOVIDAE | BOS | B. TAURUS LINN |
| GOAT | ANIMALIA | CHORDATA VETERBATA | MAMMALIA (PLACENTALIS) | UNGULAT ARTIODACTYLA RUMINANTIA | BOVIDA | CAPRA | C. HIRCUS |
| GIRAFFE | ANIMALIA | CHORDATA VETERBATA | MAMMALIA (PLACENTALIS) | UNGULAT ARTIODACTYLA RUMINANTIA | GIRAFFIDAE | GIRAFFA | G. CAMELOPARDALIS |
| HORSE | ANIMALIA | CHORDATA VETERBATA | MAMMALIA (PLACENTALIS) | UNGULAT PERISSODACTYLA | EQUIDAE | EQUUS | E. CABALLUS |
| HOG | ANIMALIA | CHORDATA CHORDATA | MAMMALIA (PLACENTALIS) | UNGULAT ARTIODACTYLA NON-RUMINANTIA | SUIDAE | SUS | S. SCROFA |

| THE NAME OF PLANTS | KINGDOM | PHYLUM OR DIVISION | CLASS | ORDER | FAMILY | GENUS | SPECIES |
|---|---|---|---|---|---|---|---|
| KELP | PLANT THALLOPHYTA WITH CHLOROPHYLL | ALGAE PHAEOPHYTA | PHAEOPHYCEAE | LAMINARIALES | LAMINARIACEAE | LAMINARIA | L. JAPONICA |
| PLAGUE | PLANT THALLOPHYTA WITHOUT CHLOROPHYLL | SCHIZOPHYTA | SCHIZOMYCETES | EUBACTERIALS | BACILLARACEAE | BALILLUS | B. PESTIS |
| CHOLERA | PLANT THALLOPHYTA WITHOUT CHLOROPHYLL | SCHIZOPHYTA | SCHIZOMYCETES | EUBACTERIALS | SPIRILLACEAE | VIBRIO | V. CHOLERAE |
| GONORRHEA | PLANT THALLOPHYTA WITHOUT CHLOROPHYLL | SCHIZOPHYTA | SCHIZOMYCETES | EUBACTERIALS | COCCACEAE | DIPLOCOCCUS | D. GONORRIIOEAE |
| YEASTS | PLANT THALLOPHYTA WITHOUT CHLOROPHYLL | EUMYCOPHYTA | ASCOMYCETES | PLECTASCINEAE | ASPERILLACEAE | ASPERGILLUS | A. ORYZAE |
| MUSHROOM | PLANT THALLOPHYTA WITHOUT CHLOROPHYLL | EUMYCOPHYTA | BASIDIOMYCETES | HYMEPOMYCETINEAE | AGARICACEAE | AGARICUS | A. COMPESTRIS |
| LIVERWORT | PLANT EMBRYOPHYTA | BRYOPHYTA | HEPATICAE | MARCHANTIALES | MARCHANTIACEAE | MARCHANTIAM | M. POLYMORPHA |

-continued

| | | | | | | | |
|---|---|---|---|---|---|---|---|
| MOSSES | PLANT | EMBRYOPHYTA | BRYOPHYTA | MUSCI | BRYALES | POLYTRICHACEAE | POLYTRICHUM | P. COMMUNE |
| HORSETAILS | PLANT | EMBRYOPHYTA | TRACHEOPHYTA | SPHENOPHYLINEAE | EQUISETALES | EQUISETACEAE | EQUISETUM | E. HIEMALE |
| BRACKEN FERN | PLANT | EMBRYOPHYTA | TRACHEOPHYTA PTEROPSIDA | FILICINEAE | F. LEPTOPORANGIATAE EUFILICINEAE | POLYPODIACEAE | PTERIDIUM | P. AQUILINUM |
| WATER FERN | PLANT | EMBRYOPHYTA | TRACHEOPHYTA PTEROPSIDA | FILICINEAE | F. LEPTOPORANGIATAE HYDROPTESIDES | MARSILIAZEAE | MARSILIA | M. QUADRIFOLIA |
| CYCAD | PLANT | EMBRYOPHYTA | TRACHEOPHYTA SPERMOPSIDA | GYMNOSTERMAE CYCADOPHYTAE | CYCADALES | CYCADACEAN | CYCAS | O. REVOLUTA |
| REDWOOD | PLANT | EMBRYOPHYTA | TRACHEOPHYTA SPERMOPSIDA | GYMNOSTERMAE CONIFEROPHYTAE | CONIFERALES | TAXODIACEAE | SEQUOIA | S. SEMPERVIRENS |
| GINKGO | PLANT | EMBRYOPHYTA | TRACHEOPHYTA SPERMOPSIDA | GYMNOSTERMAE CONIFEROPHYTAE | GINKGOALES | GINKGOALEAE | GINKGO | G. BILOBA |
| ONION | PLANT | EMBRYOPHYTA | TRACHEOPHYTA SPERMOPSIDA | ANGIOSPERMAE MONOCOTYEDONEAE | LILIIFLORAE | AMARYLLIDACEAE | ALLIUM | A. CEPA |
| COCONUTS | PLANT | EMBRYOPHYTA | TRACHEOPHYTA SPERMOPSIDA | ANGIOSPERMAE MONOCOTYEDONEAE | PRINCIPES | PALMAE | COCOS | C. NUCIFERA |
| RICE | PLANT | EMBRYOPHYTA | TRACHEOPHYTA SPERMAPSIDA | ANGIOSPERMAE MONOCOTYEDONEAE | GLUMIFLORAE | GRAMINEAE | ORYZA | O. SATIVA |
| ORCHID | PLANT | EMBRYOPHYTA | TRACHEOPHYTA SPERMOPSIDA | ANGIOSPERMAE MONOCOTYEDONEAE | MICROSPERMAE | ORCHIDACEAE | CYPRIPEDIUM | C. VIRENS |
| BANANA | PLANT | EMBRYOPHYTA | TRACHEOPHYTA SPERMOPSIDA | ANGIOSPERMAE MONOCOTYEDONEAE | SCITAMINEAE | MUSACEAE | MUSA | M. BASJOO |
| SOYBEAN | PLANT | EMBRYOPHYTA | TRACHEOPHYTA SPERMOPSIDA | ANGIOSPERMAE DICOTYLEDONEAE | ROSALES | LEGUMINOSAE | GLYCINE | G. HISPIDA |
| CHRYSAN-THEMUM | PLANT | EMBRYOPHYTA | TRACHEOPHYTA SPERMOPSIDA | ANGIOSPERMAE DICOTYLEDONEAE | CAMPANULATEA | COMPOSITAE | CHRYSAN-THEMUM | C. SINENSE |
| APPLE | PLANT | EMBRYOPHYTA | TRACHEOPHYTA SPERMOPSIDA | ANGIOSPERMAE DICOTYLEDONEAE | ROSALES | ROSACEAE | PIRUS | P. MALUS |
| PUMPKIN | PLANT | EMBRYOPHYTA | TRACHEOPHYTA SPERMOPSIDA | ANGIOSPERMAE DICOTYLEDONEAE | CAMPANULATAE | CUCURBITACEAE | CUCURBITA | C. PEPO |
| POTATO | PLANT | EMBRYOPHYTA | TRACHEOPHYTA SPERMOPSIDA | ANGIOSPERMAE DICOTYLEDONEAE | TABIFLORAE | SOLANACEAE | SOLANUM | S. TUBEROSUM |
| MINT | PLANT | EMBRYOPHYTA | TRACHEOPHYTA SPERMOPSIDA | ANGIOSPERMAE DICOTYLEDONEAE | TABIFLORAE | LABIATAE | MENTHA | M. ARVENSIS |
| BROCCOLI | PLANT | EMBRYOPHYTA | TRACHEOPHYTA SPERMOPSIDA | ANGIOSPERMAE DICOTYLEDONEAE | RHOEADALES | CRUCIFERAE | BRASSICA | B. ITALICA |
| CARROT | PLANT | EMBRYOPHYTA | TRACHEOPHYTA SPERMOPSIDA | ANGIOSPERMAE DICOTYLEDONEAE | UMBELLIFLORAE | UMBELLIFERAE | DAUCUS | D. CAROTA |
| COTTON | PLANT | EMBRYOPHYTA | TRACHEOPHYTA SPERMOPSIDA | ANGIOSPERMAE DICOTYLEDONEAE | MALVAIS | MALVACEAE | GOSSYPIUM | G. HERBACEUM |
| PRICKLY | PLANT | EMBRYOPHYTA | TRACHEOPHYTA EMBRYOPHYTA | ANGIOSPERMAE DICOTYLEDONEAE | OPUPTIALES | CACTACEAE | OPUNTIA | O. FICUS |
| BARREL CACTUS | PLANT | EMBRYOPHYTA | TRACHEOPHYTA EMBRYOPHYTA | ANGIOSPERMAE DICOTYLEDONEAE | OPUPTIALES | CACTACEAE | CEREUS | C. MULTIPLEX |
| COLD | MATTER | ORGANIC MATTER | | | SENSATION | TOUCH | MUCH LESS WARMER THAN THE HUMAN BODY | |
| SWEETNESS | MATTER | ORGANIC MATTER | | | SENSATION | TASTE | HAVING A PLEASANT TASTE OR FLAVOR LIKE SUGAR | |
| STENCH | MATTER | ORGANIC MATTER | | | SENSATION | SMELL | A BAD SMELL; FOUL ODOR; STINK | |
| MELODY | MATTER | ORGANIC MATTER | | | SENSATION | HEARING | A SONG OR TUNE | |

-continued

| | | | | | |
|---|---|---|---|---|---|
| WHITE | MATTER | MATTER ORGANIC | SENSATION | MUSIC SIGHT LIGHT | REFLECTING LIGHT WITHOUT ABSORBING ANY OF THE RAYS COMPOSING IT |
| YELLOW | MATTER | ORGANIC MATTER | SENSATION | SIGHT COLOR | THE COLOR OF GOLD |
| IDEA | INTELLECT | FORMATION OF IDEAS | INTELLECTUAL OPERATIONS IN GENERAL | | A THOUGHT; FANCY: OPINION |
| COMPARISON | INTELLECT | FORMATION OF IDEAS | PRECURSORY CONDITION AND OPERATION | | THE ACT OR PROCESS TO FINDING THE LIKENESS AND DIFFERENCE |
| EVIDENCE | INTELLECT | FORMATION OF IDEAS | MATERIALS FOR REASONING | | WHATEVER MAKES CLEAR THE TRUTH OR FALSEHOOD OF SOMETHING |
| ERROR | INTELLECT | FORMATION OF IDEAS | RESULTS OF REASONING | | THE CONDITION OF BEING MISTAKEN |
| EXPECTATION | INTELLECT | FORMATION OF IDEAS | EXTENSION OF THOUGHT | | A THING EXPECTED OR LOOKED FORWARD TO |
| SUPPOSITION | INTELLECT | FORMATION OF IDEAS | CREATIVE THOUGHT | | THE ACT OF SUPPOSING |
| METAPHOR | INTELLECT | COMMUNICATION OF IDEAS | NATURE OF IDEAS COMMUNICATED | | IMPLIED COMPARISON BETWEEN TWO DIFFERENT THINGS |
| LEARNING | INTELLECT | COMMUNICATION OF IDEAS | MODES OF COMMUNICATION | | TO GAINING OF KNOWLEDGE OR SKILL |
| PAINTING | INTELLECT | MEANS OF COMMUNICATION OF IDEA | NATURAL | | THE ART OF DEPRESENTATION DECORATION AND CREATING BEAUTY WITH PAINTS |
| LANGUAGE | INTELLECT | MEANS OF COMMUNICATING IDEAS | CONVENTIONAL | | HUMAN SPEECH, SPOKEN OR WRITTEN |
| PERSPICUITY | INTELLECT | MEANS OF COMMUNICATING IDEAS | QUALITIES OF STYLE | | CLEARNESS IN EXPRESSION |
| SPEECH | INTELLECT | MEANS OF COMMUNICATING IDEAS | SPOKEN LANGUAGE | | THE ACT OF SPEAKING; UTTERING OF WORDS OR SENTENCES |
| POETRY | INTELLECT | MEANS OF COMMUNICATING IDEAS | WRITTEN LANGUAGE | | POETRY |
| TERGIVERSATION | VOLITION | INDIVIDUAL VOLITION | VOLITION IN GENERAL | ACTS | CHANGE OF ATTITUDE OR OPINIONS |
| DISSUASION | VOLITION | INDIVIDUAL VOLITION | VOLITION IN GENERAL | CAUSES | THE ACT TO PERSUADE A PERSON NOT TO DO |
| GOOD | VOLITION | INDIVIDUAL VOLITION | VOLITION IN GENERAL | OBJECTS | HAVING THE RIGHT QUALITIES |
| WAY | VOLITION | INDIVIDUAL VOLITION | PROSPECTIVE VOLITION | CONCEPTIONAL | A METHOD |
| TOOL | VOLITION | INDIVIDUAL VOLITION | PROSPECTIVE VOLITION | SUBSERVIENCE TO END | ANY INSTRUMENT IN DOING WORK |
| PREPARATION | VOLITION | INDIVIDUAL VOLITION | PROSPECTIVE VOLITION | PRECURSORY MEASURES | A PREPARING |
| ACTION | VOLITION | INDIVIDUAL VOLITION | VOLUNTARY ACTION | SIMPLE | THE PROCESS OF ACTING |
| PRECEPT | VOLITION | INDIVIDUAL VOLITION | VOLUNTARY ACTION | COMPLEX | A RULE OF ACTION OR BEHAVIOR |
| FACILITY | VOLITION | INDIVIDUAL VOLITION | ANTAGONISM | CONDITIONAL | EASY |
| AID | VOLITION | INDIVIDUAL VOLITION | ANTAGONISM | ACTIVE | TO GIVE HELP OR SUPPORT |
| SUCCESS | VOLITION | INDIVIDUAL VOLITION | RESULTS | | FAVORABLE RESULT |

-continued

| | | OF ACTION | | |
|---|---|---|---|---|
| OBEDIENCE | VOLITION | INTERSOCIAL VOLITION | GENERAL | SUBMISSION TO AUTHORITY OR LAW |
| PERMISSION | VOLITION | INTERSOCIAL VOLITION | SPECIAL | CONSENT |
| COMPACT | VOLITION | INTERSOCIAL VOLITION | CONDITIONAL | A CONTRACT BETWEEN PARTIES |
| LOSS | VOLITION | INTERSOCIAL VOLITION | POSSESSIVE RELATIONS | PROPERTY IN GENERAL | FAILURE TO KEEP |
| SALE | VOLITION | INTERSOCIAL VOLITION | POSSESSIVE RELATIONS | INTERCHANGE OF PROPERTY | THE EXCHANGE OF GOODS FOR MONEY |
| POVERTY | VOLITION | INTERSOCIAL VOLITION | POSSESSIVE RELATIONS | MONETARY RELATIONS | THE CONDITION OF BEING POOR |
| JOY | AFFECTIONS | PERSONAL AFFECTIONS | PASSIVE | A STRONG FEELING OF PLEASURE |
| BEAUTY | AFFECTIONS | PERSONAL AFFECTIONS | DISCRIMINATIVE | POSSESSING QUALITIES WHICH DELIGHT THE MIND AND SENSES |
| HOPE | AFFECTIONS | PERSONAL AFFECTIONS | PROSPECTIVE | A FEELING THAT WHAT ONE DESIRES WILL HAPPEN |
| WONDER | AFFECTIONS | PERSONAL AFFECTIONS | CONTEMPLATIVE | THE FEELING CAUSED BY WHAT IS STRANGE AND SURPRISING |
| REPUTE | AFFECTIONS | PERSONAL AFFECTIONS | EXTRINSIC | CHARACTER IN THE OPINION OF OTHERS |
| FRIEND | AFFECTIONS | SYMPATHETIC | SOCIAL | A PERSON WHO FAVORS AND SUPPORTS |
| MALEVOLENCE | AFFECTIONS | SYMPATHETIC | DEFENSIVE | THE WISH THAT EVIL MAY HAPPEN TO OTHERS |
| PITILESSNESS | AFFECTIONS | SYMPATHETIC | SPECIAL | WITHOUT PITY OR MERCY |
| JEALOUSY | AFFECTIONS | SYMPATHETIC | RETROSPECTIVE | CHARACTERIZED BY ENVY OR SUSPICIOUS FEAR |
| RIGHT | AFFECTIONS | MORAL | OBLIGATION | GOOD |
| RESPECT | AFFECTIONS | MORAL | SENTIMENTS | STANDING WELL IN THE OPINION OF OTHERS |
| VIRTUE | AFFECTIONS | MORAL | CONDITION | MORAL EXCELLENCE; GOODNESS |
| PURITY | AFFECTIONS | MORAL | PRACTIVE | FREEDOM FROM EVIL OR IMPROPER MOTIVE |
| REWARD | AFFECTIONS | MORAL | INSTITUTIONS | TO SHOW APPRECIATION OF |
| DEVIL | AFFECTIONS | RELIGIOUS | SUPERHUMAN | AN EVIL SPIRIT |
| RELIGION | AFFECTIONS | RELIGIOUS | DOCTRINES | BELIEF AND WORSHIP OF GOD OR GODS |
| IMPIETY | AFFECTIONS | RELIGIOUS | SENTIMENTS | DON'T TO REVERENCE GOD |
| WORSHIP | AFFECTIONS | RELIGIOUS | ACTS | GREAT HONOR AND RESPECT |

From the above description it will thus be seen that there has been provided a novel and improved classification language and method of formulating same; which classification language and method is relatively easy to formulate while at the same time providing classification words from which the full definition of the word may be easily and readily derived and recognized.

It is understood that although I have shown the preferred form of my invention that various modifications may be made in the details thereof without departing from the spirit as comprehended by the following claims.

I claim:

1. A classification medium; comprising:
   (a) a plurality of word block means each corresponding to a particular word means;
   (b) each of said word block means carrying a plurality of selected symbols arranged in a predetermined order;
   (c) the meaning of each of said word block means being defined by comprising a plurality of distinguishing characteristic subblocks for definition each associated with one of said selected symbols and corresponding to a particular distinguishing characteristic and together giving a meaning associated with said word block means;
   (d) a group of particular word block means including one or more identical distinguishing characteristic subblocks of definition constituting a particular classification group;
   (e) each word block means within a particular classification group including at least one distinguishing characteristic subblock for definition that distinguishes it from other particular word block means within a particular classification group;
   (f) each of said selected symbols carried on subblocks forming a particular word block means, representing a different corresponding distinguishing characteristic of definition of said particular word block means;
   (g) identical distinguishing characteristic subblocks for definition of particular word block means from within a particular classification group bearing identical selected symbols;
   (h) said predetermined order for said selected symbols being identical for identical distinguishing characteristic subblocks of definition for particular word block means of a particular classification group and differing for those distinguishing characteristics of definition that distinguish one particular word block means from another particular word block means for a particular classification group.

2. The classification language of claim 1, wherein each symbol from said plurality of selected symbols includes at least one letter from a selected alphabet.

3. The classification language of claim 2, wherein said selected alphabet in the english language alphabet.

4. The classification language of claim 2, wherein at least some symbols from said plurality of selected symbols include at least two letters from said selected alphabet.

5. The classification language of claim 2, wherein at least some symbols include more than two letters from aid selected alphabet.

6. The classification language of claim 5, wherein at least some symbols from said plurality of symbols include all or a portion of an english language corresponding to the word spelled out by all the selected symbols taken together.

7. The classification of language claim 1, wherein said distinguishing characteristics of meaning are derived from a selected plan of classification.

8. The classification language of claim 7, wherein said selected plan of classification follows that for words arranged according to the plan of classification of Roget's Thesaurus.

9. The classification language of claim 8, wherein said words are from the english language.

10. The classification language of claim 8, wherein a first distinguishing characteristic of meaning for each english language word is selected from a first group of available distinguishing characteristics of meaning according to said plan of classification.

11. The classification language of claim 10, wherein said first group of available distinguishing characteristics of meaning includes a selected set of first group classifications.

12. The classification language of claim 11, wherein said selected set of first group classifications includes at least six first group classifications.

13. The classification language of claim 12, wherein said six first group classifications are abstract relation, space, matter, intellect, volition, and affection.

14. The classification language of claim 13, wherein a predetermined first group classification symbol is assigned to each of said first group classifications.

15. The classification language of claim 14, wherein each of said predetermined first group classification symbol is different.

16. The classification language of claim 14, wherein a second distinguishing characteristic of meaning for each english language word is selected from a second group of available distinguishing characteristics of meaning; their being a different second group of available distinguishing characteristics of meaning for each of said distinguishing characteristics of meaning of said first group of available distinguishing characteristics of meaning.

17. The classification language of claim 16, wherein each of said second groups of available distinguishing characteristics of meaning includes a selected set of second group classifications.

18. The classification language of claim 17, wherein said selected set of second group classifications for said first group classification "abstract relation" includes second group classifications existence, relation, quantity, order, number, time, change, and causation. Third and fourth group classification existence (abstract, concrete, formal(1) internal (2) external, modal (1) absolute (2) relative), relation (absolute, continuous, partial, general) quantity (simple, comparative (1) by comparison with a standard (2) by comparison with an object (3) changes in quantity, conjunctive, concrete), order (general, consecutive, collective, distributive, categorical), number (abstract, determinate, indeterminate), Time (absolute (1) definite (2) indefinite, relative (1) to succession (2) to a period (3) to an effect or purpose, recurrent), change (simple, complex (1) present (2) future.) causation (constancy of sequence, connection between cause and effect, power in operation, indirect power, combination of causes).

19. The classification language of claim 18, wherein a predetermined second, third and fourth group classification symbol is assigned to each of said second, third and fourth group classifications.

20. The method of formulating a classification language, comprising:
 (a) selecting one or more subblocks corresponding to distinguishing characteristics of definition for each word of a plurality of words from a selected classification language;
 (b) arranging said subblocks corresponding to distinguishing characteristics of definition in a predetermined classification order so that subblocks bearing identical distinguishing characteristics of definition, for different ones of said plurality of words, are in the same positions;
 (c) arranging groups of blocks of subblocks corresponding to words from said plurality of words and which have one or more identical distinguishing characteristics of definition into classification groups.
 (d) arranging said subblocks in such an order that said predetermined order within each of said classification groups takes a form in which i) distinguishing characteristics of definition that are identical for all of said words are arranged first, (ii) distinguishing characteristics of definition that are identical for most but not all said words are arranged next, (iii) distinguishing characteristics of definition thereafter are arranged in declining number of identicality, and (iv) different distinguishing characteristics of definition are arranged last;
 (e) assigning a symbol to each different distinguishing characteristics of definition and placing said symbol on its respective subblock, with like symbols being assigned to like distinguishing characteristics of definition within each such classification group to form a classification word; and
 (f) forming a classification word, corresponding to each word of said plurality of words in accordance with the above steps.

* * * * *